(12) United States Patent
Zukerman et al.

(10) Patent No.: US 7,272,111 B2
(45) Date of Patent: Sep. 18, 2007

(54) ACTIVE QUEUE MANAGEMENT PROCESS

(75) Inventors: Moshe Zukerman, Mount Waverley (AU); Bartek Peter Wydrowski, West Brunswick (AU)

(73) Assignees: The University of Melbourne, Victoria (AU); Hewlett-Packard Australian Limited, Victoria (AU)

(*) Notice: Subject to any disclaimer, the term of this patent is extended or adjusted under 35 U.S.C. 154(b) by 1051 days.

(21) Appl. No.: 10/215,182

(22) Filed: Aug. 9, 2002

(65) Prior Publication Data
US 2003/0088690 A1 May 8, 2003

(30) Foreign Application Priority Data
Aug. 9, 2001 (AU) .................................. PR 6882

(51) Int. Cl.
*H04L 12/26* (2006.01)
(52) U.S. Cl. .................. 370/230; 370/412; 709/235
(58) Field of Classification Search .................. None
See application file for complete search history.

(56) References Cited
U.S. PATENT DOCUMENTS
6,690,645 B1* 2/2004 Aweya et al. ............... 370/230

2001/0026555 A1* 10/2001 Cnodder et al. ............. 370/412
2001/0032269 A1* 10/2001 Wilson ........................ 709/235
2002/0188648 A1* 12/2002 Aweya et al. ............... 709/102

* cited by examiner

*Primary Examiner*—Chi Pham
*Assistant Examiner*—Phuc Tran
(74) *Attorney, Agent, or Firm*—Nixon & Vanderhye P.C.

(57) ABSTRACT

An active queue management (AQM) process for network communications equipment. The AQM process is rate based and involves applying at a rate congestion notification to communications packets in a queue of a link, and adjusting the rate of congestion notification on the basis of the difference between an arrival rate for the packets and a target capacity of the link. Network communications equipment includes a switch component for switching communications packets between input ports and output ports, packet queues for at least the output ports, and an active queue manager for applying congestion notification to communications packets in the queues for the output ports. The congestion notification is applied at respective rates for the queues, and the rates of congestion notification adjusted on the basis of the respective arrival rates of the packets for the queues of the output ports. The AQM process can be applied to a class based DiffServ architecture.

17 Claims, 9 Drawing Sheets

ACTIVE QUEUE MANAGEMENT PROCESS

FIELD OF THE INVENTION

The present invention relates to an active queue management process, and network equipment for executing the process.

BACKGROUND OF THE INVENTION

The Internet is essentially a network of interconnected queues. The queues are maintained at the ports of the various routers, switches and servers that form the links of the communications network that is the Internet. The network equipment, or nodes, maintain the packet queues using queue management processes executed by the equipment. Packets traversing the network experience delay and loss. The Internet is facing increasing packet loss rates and queuing delays. Lost packets waste resources, whereas queuing causes packet delay which reduces the quality of interactive applications.

Active queue management (AQM) processes have been introduced to alleviate the problems of network congestion. In general, AQM processes control congestion by controlling flow. Congestion is measured and a control action is taken. AQMs apply a congestion notification rate, using packet marking or dropping, to control the effective 'price' of bandwidth detected at a packet source so that the arrival rate for a link is at or below the link's capacity. An AQM can be conceptualised as generating a resource 'price' determination at the link and the source then follows a utility process that determines its consumption of bandwidth based on the resource 'price'.

There have been two approaches for measuring congestion: (1) queue based, and (2) flow based. In queue based AQMs congestion is observed by queue size. The drawback of this is that a backlog of packets is inherent in the control mechanism, as congestion is observed when the queue is already positive. This creates unnecessary delay and jitter.

The total network delay is essentially the sum of queuing delay, in routers and switches and other equipment of the network, and propagation delay in the physical transport medium, such as the optical fibre or copper wire that support the links. Currently queuing delay dominates most round trip times (RTT), being the time a packet takes to travel from a source to a destination and return. An ideal is to reduce the network delay to just the propagation delay.

Currently packet loss is both a signal of congestion and result of overflowing queues. The Internet Engineering Task Force (IETF) is introducing explicit congestion notification (ECN) to feedback congestion by packet marking instead, as discussed in RFC 2481. Congestion notification itself may be taken to involve either packet dropping or ECN. With ECN, AQM queues can operate with minimal packet loss.

It is desired to provide an AQM process that maintains high link utilisation whilst achieving the QoS (Quality of Service) requirements of limited packet loss and delay, or at least provide a useful alternative.

SUMMARY OF THE INVENTION

In accordance with the present invention there is provided an active queue management process, including:
applying at a rate congestion notification to communications packets in a queue of a link; and
adjusting said rate of congestion notification on the basis of the difference between an arrival rate for said packets and a target capacity of said link.

The present invention also provides an active queue management process, including:
applying congestion notification to communications packets in a plurality of queues of a link, said congestion notification being applied at respective rates for said queues; and
adjusting said rates of notification on the basis of the respective arrival rates for said packets in said queues.

The present invention also provides an active queue management process, including:
applying at a rate congestion notification to communication packets in a queue of a link; and
inducing a delay or setting a limit on the rate for said packets without ECN.

The present invention also provides network communications equipment, including:
a switch component for switching communications packets between input ports and output ports;
packet queues for at least said output ports; and
an active queue manager for applying congestion notification to communications packets in the queues for said output ports, said congestion notification being applied at respective rates for said queues, and adjusting said rates of congestion notification on the basis of the respective arrival rates of the packets for said queues of said output ports.

BRIEF DESCRIPTION OF THE DRAWINGS

Preferred embodiments of the present invention are hereinafter described with reference to the accompanying drawings, wherein.

DETAILED DESCRIPTION OF PREFERRED EMBODIMENTS OF THE INVENTION

Active Queue Management processes are executed by network equipment that is capable of transmitting and receiving packets of a packet communications network, such as the Internet. The equipment includes routers, switches and servers that have input/output ports coupled to a physical transmission medium, such as optical fibre, cable or copper wire. Queues are established at the ports to control the transmission and reception of packets on the links established between the ports. This is required to ensure that link congestion does not occur, as each link only has a predetermined capacity.

Figure 1:
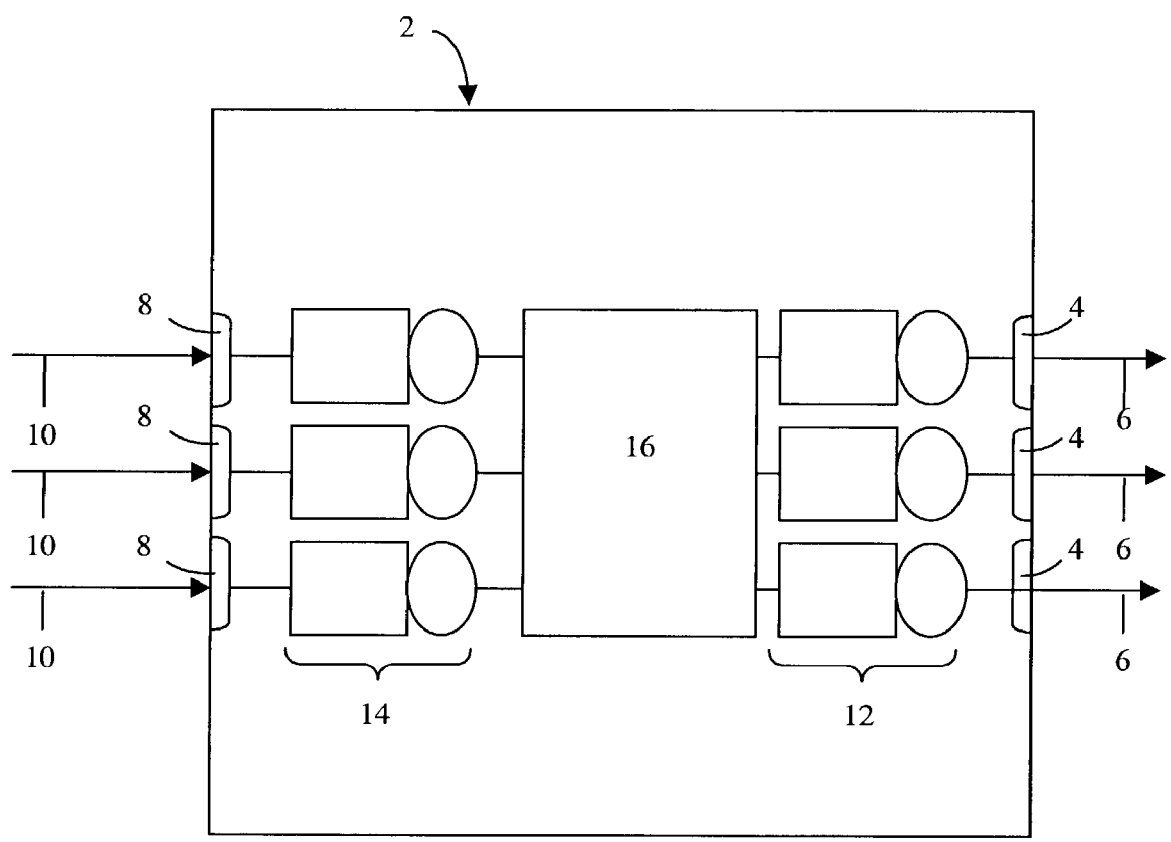
FIG. 1 is a block diagram of a router of a communications network having an AQM process.

For instance, a router 2, as shown in FIG. 1, has a plurality of output communication ports 4 connected to physical media that are used to establish output communication links 6 to other ports. The router also has input ports 8 for input communication links 10. The links 6, 10 may be logical or physical links. The router may be specifically configured to handle IP (Internet Protocol) packets, and each port 4, 8 has a packet queue 12, 14 allocated to each link 6, 10 of the port. For the ingress links 10, the packet queues 14 buffer the received packets and serve them to a switch matrix 16 of the router 2. The packets output by the switch matrix 16 are passed to the queues 12 and served to the respective egress links 6. The queues 12 and 14 normally have a predetermined buffer size. The queues 12,14 may be maintained by dedicated hardware components, but normally the processes and the queues are implemented in software executed by the router 2.

Typically the active queue management process is implemented on the output queues 12. Yet it is possible to include packets in the input queues as part of the active queue management process. A number of queue management processes have been used or previously proposed. Examples, discussed below, include Droptail, Random Early Drop, BLUE and Random Exponential Marking.

For Droptail when queue overflow occurs, arriving packets are simply dropped. This leads to high queue sizes and high loss rates at congested links. Droptail is effectively 'no management'.

Random Early Drop (RED) is discussed in S. Floyd and K. Fall, "Router mechanisms to support end-to-end congestion control", February 1997, LBL Technical Report, Sally Floyd, Van Jacobson, "Random Early Detection Gateways for Congestion Avoidance" IEEE/ACM Transactions on Networking, V.1 N.4, August 1993, p. 397-413 and W. Feng, D. Kandlur, D. Saha, K. Shin, "Blue: A New Class of Active Queue Management Algorithms" U. Michigan CSE-TR-387-99, April 1999 ("Feng"). RED is a first generation AQM. The rate of congestion notification is a function of the queue size. As discussed in depth in Feng, RED suffers from severe shortcomings. The queue size is not a good indicator of the severity of the congestion, and the level of congestion notifications issued may be too great and bursty, leading to excessive packet loss. RED is prone to periods of high loss followed by link under-utilization.

BLUE is discussed in Feng, and is a hybrid flow and queue based congestion control scheme. It uses packet loss (queue) and link under-utilization (flow) events to adjust the rate of congestion notification. The congestion notification rate $p_m$ is increased at a set rate if the queue size exceeds a threshold L, and it is decreased if the link is idle. The amount of increase is d1, and decrease d2, at a rate of 1/freezetime.

BLUE behaves well if operated within a region of RTT and number of connections N for which the parameters d1 and d2 were set. However, changes in the dominant RTT of the connections going through the queue, or a significant change in N, the number of connections across the link, can invalidate the parameter settings and lead to queue backlog oscillation between loss and under-utilization. The amount of change of notification rate $p_m$ during a queue full or link idle event, is the product of the time spent in this event multiplied by the rate of change d(1, 2)/freezetime. This time is related to the delay in the response of the TCP (Transmission Control Protocol) sources to the changed notification rate (2×RTT). The greater the RTT, the greater will be the $p_m$ adjustment. If the RTT increases, so does the change in $p_m$ and this may result in backlog oscillation. Another cause of instability is a large change in the number of connections. This instability is the result of the adjustment of congestion notification rate $p_m$ by a constant d1 or d2, despite the non linear relation of $P_m$ and N. Based on the TCP Friendly Equation, which models the TCP throughput, as discussed in Floyd, S. and Fall, K, "Router mechanisms to support end-to-end congestion control", *Tech.rep, LBL*, 1997. (http://www.aciri.org/floyd/papers/collapse.ps) ("Floyd"), the function of $P_m$ versus N requires larger changes of $P_m$ for larger N.

Random Exponential Marking (REM) is discussed in S. Athuraliya and S. H. Low. "Optimization Flow Control, II: Random Exponential Marking", http:H/netlab.caltech.edu/netlab-pub/cbef.pdf. REM is primarily a flow measurement based control scheme. It is a distributed process that optimises the global network performance. Bandwidth prices are communicated to sources by packet marking and sources adjust their demand accordingly.

Three different alternative pricing algorithms PC1-PC3 constitute REM. PC3 is considered herein because of its superiority over PC1 and PC2:

$$PC3: p_l(t+1)=[p_l(t)+\gamma(\alpha b_l(t)+x^l(t)-c_l)]^+ \quad (1)$$

where $x^l$ is the aggregate arrival rate, $c_l$ link capacity, $b_l$ backlog, and $\alpha$ and $\gamma$ are pricing constants. An exponential function determines the marking probability from the link price:

$$m=1-\phi^{-p_l(t)} \quad (2)$$

where $\phi$ controls marking. Although REM works very well in a steady state situation, the behaviour in transient conditions, and with realistically constrained buffer sizes is not necessarily optimal. The experimental results, discussed below, detail how in an environment with a wide variation in N and finite buffers the performance suffers.

A preferred embodiment of the present invention is an AQM process that is hereinafter referred to as GREEN. The GREEN process is a feedback control procedure which adjusts the rate of congestion notification in response to a flow based congestion measure, $x_{est}$, being the estimated data arrival rate. GREEN is based on a threshold function. If the estimated data arrival rate $x_{est}$ for a link 6,10 is above the target link capacity $c_t$, the rate of congestion notification, P, is incremented by $\Delta P$ at a rate of $1/\Delta T$. $1/\Delta T$ is the update rate, where $\Delta T$ is the time interval between updates. Note that it is also possible to reformulate the AQM process such that the update occurs at every packet arrival, rather than at the deterministic rate $1/\Delta T$. In this case $1/\Delta T$ represents the mean rate of update. Conversely, if $x_{est}$ is below $c_t$, P is decremented by $\Delta P$ at a rate of $1/\Delta T$. The process applies probabilistic marking of incoming packets at the rate P, either by dropping packets, or setting the ECN. With a step function U(x) defined by:

$$U(x) = \begin{cases} +1 & x \geq 0 \\ -1 & x < 0. \end{cases} \quad (3)$$

Therefore, $$P = P + \Delta P \cdot U(x_{est} - c_t) \quad (4)$$

The target link capacity, $c_t$ is assigned a value just below the actual link capacity c, typically 0.97 c, so that the queue size converges to 0. Incoming data rate estimation is performed using exponential averaging:

$$x_{est} = (1 - \exp(-Del/K)) \cdot (B/Del) + \exp(-Del/K) \cdot x_{est} \quad (5)$$

where Del is the inter-packet delay, ie the time between the most recent and previous packet arrival, B the packet size and K a time constant. Other arrival rate estimation techniques could also be used successfully.

Figure 2:
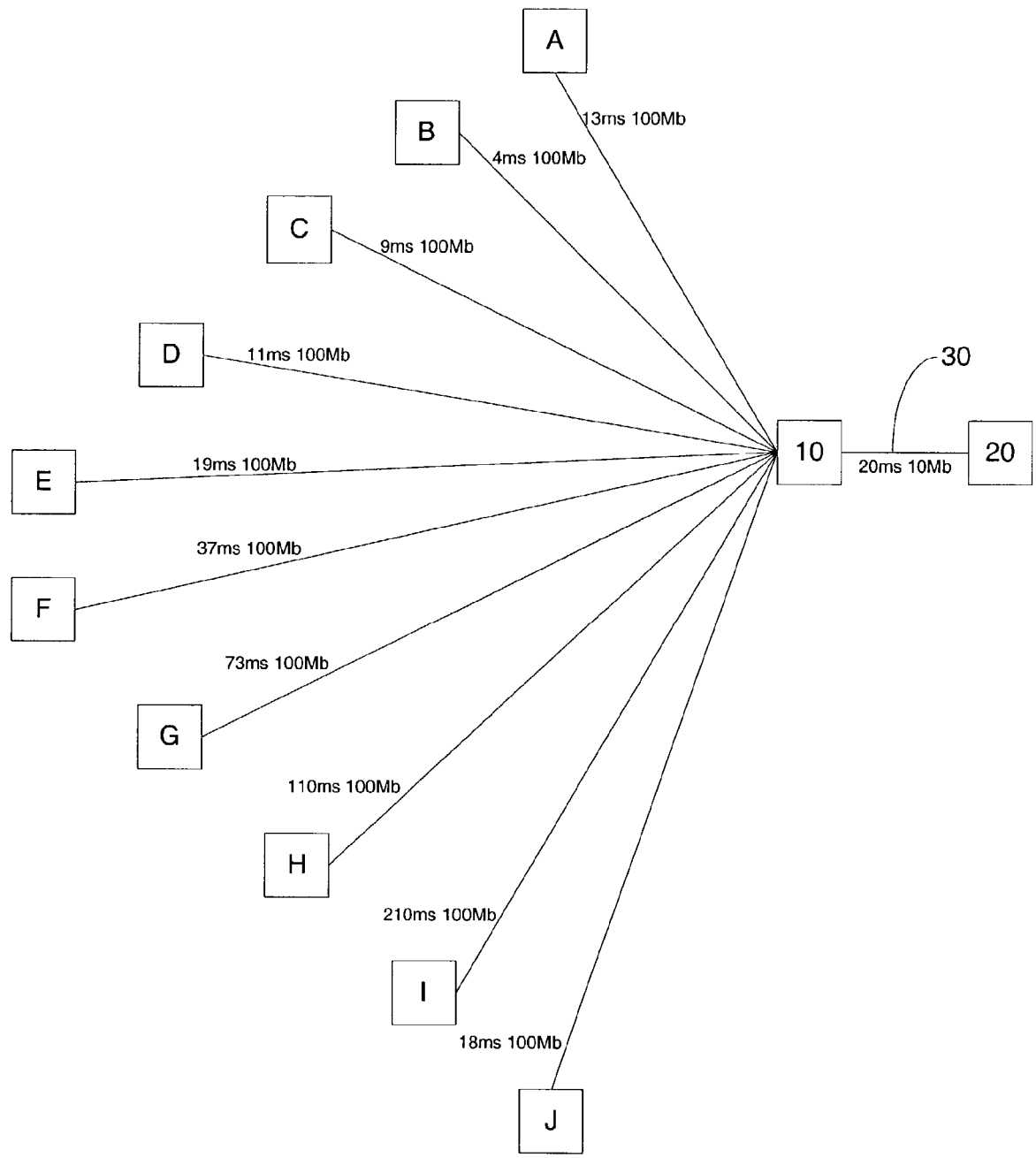
FIG. 2 is a diagram of nodes of a communications network in which an AQM process is executed.

Three trials were performed to compare the performance of GREEN, REM, BLUE, RED and Droptail using the NS-2 network simulator available at http://www.isi.edu/nsnam/ns/. The network topology for the trials, as shown in FIG. 2, includes a number of nodes A-J that act as TCP/IP packet sources and a node 20 as the sink destination node. The AQM process is placed in and executed by a node 10, which acts as an edge router connected to each of the TCP/IP sources A-J and a link 30 between the node 10 and the sink node 20. The link 30 has a 20 ms propagation delay and has capacity of 10 Mb. For the links from the sources A-J the propagation delays and the capacities are set out below.

TABLE 1

| Source | Delay (ms) | Capacity (Mb) |
|--------|-----------|---------------|
| A | 13 | 100 |
| B | 4 | 100 |
| C | 9 | 100 |
| D | 11 | 100 |
| E | 19 | 100 |
| F | 37 | 100 |
| G | 73 | 100 |
| H | 110 | 100 |
| I | 210 | 100 |
| J | 18 | 100 |

Each trial lasted 120 seconds with measurements being taken after a 20 second warm up period. Multiple TCP connections were allowed to originate from each source. The active TCP connections were evenly distributed among the A-J sources. Connections were started at a uniformly distributed time over the test period with a uniformly distributed duration between 3 and 23 seconds. The packet size was 1000 bytes.

The configuration parameters for each of the AQMs followed the following settings. RED: $\min_{th} = 20\%$ and $\max_{th} = 80\%$ of the queue size. BLUE: Threshold L is 66% of the queue size. d1=0.001, d2=0.0002, freezetime=10 ms. REM: (Parameters adapted from 'Interworking with Reno' in S. Athuraliya and S. H. Low. "Optimization Flow Control, II: Random Exponential Marking", http://netlab.caltech.edu/netlab-pub/cbef.pdf.), $\gamma$=0.01 $\phi$=1.003 $\alpha$=0.1 updatetime=0.01 bo=55. (Public domain rem-mark.cc, was used). GREEN: $\Delta T$=10 ms, $\Delta P$=0.001, $C_t$=0.97% of Capacity, K=0.1. All AQM processes were configured to use ECN.

For Trial 1, the AQMs were tested under different traffic loads, by varying the number of TCP sessions. The total number of TCP sessions activated in a 120 s simulation period was varied from 100 to 1300 (11 to 141 concurrent sessions on average), in increments of 100 sessions. The buffer size was 91 packets (72.8ms), making some of the connections' bandwidth delay greater than this. Table 2, below, summarizes the utilisation, loss and delay of the 13 simulation periods (100 to 1300 sessions) from each AQM.

TABLE 2

Trial 1 - Result Summary

| | Droptail | RED | BLUE | REM | GREEN |
|---|---------|-----|------|-----|-------|
| Util % | 0.98 | 0.98 | 0.95 | 0.96 | 0.97 |
| Loss % | 6.85 | 5.43 | 0.14 | 0.23 | 0.05 |
| Delay(ms) | 52.45 | 52.41 | 13.95 | 21.68 | 18.79 |

RED and Droptail suffered unacceptable loss and delay across the whole range of results. BLUE performed well in packet loss and delay, at the price of utilisation. To match the utilisation of the other processes, the buffer size of the queue would have to be increased significantly resulting in larger average backlog and loss.

GREEN slightly outperformed REM. The traffic in an edge router may vary from tens to hundreds of connections, which represents a vast change in the aggregation of the traffic. An AQM process should cope with this range of traffic conditions without reconfiguration. GREEN performs better across a wide range of sessions as described below for Trial 3.

Figure 3:
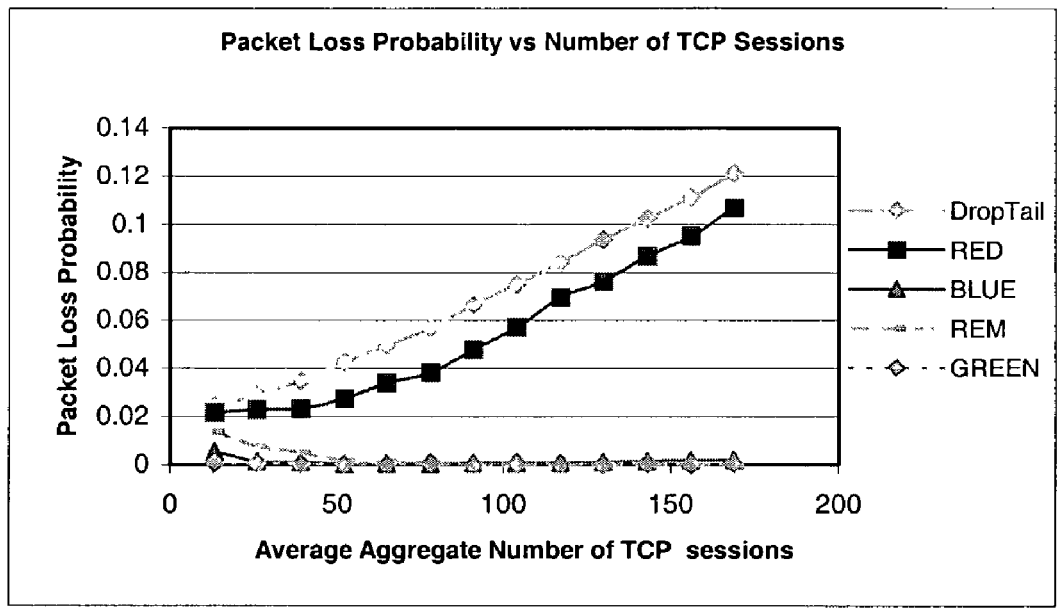
FIG. 3 is a graph of packet loss probability against average number of TCP sessions for a number of AQM processes.
Figure 4:
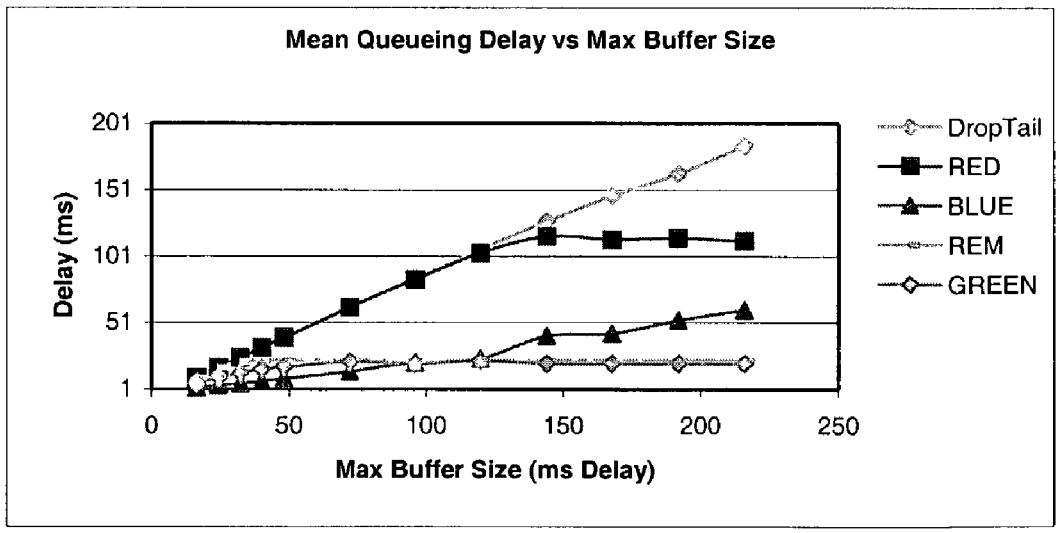
FIG. 4 is a graph of mean queuing delay against maximum buffer size for a number of AQM processes.

For Trial 2, the buffer size was varied to determine the performance of AQMs under the realistic constraint of finite buffer sizes, such as the bandwidth delay product of the network. 1000 TCP sessions over 120 seconds were initiated for each queue size. The Packet loss and delay measured are shown in FIGS. 3 and 4 respectively.

Trial 2 shows clearly how queue based AQMs maintain a higher average backlog. FIG. 3 demonstrates that the backlog for RED, Droptail and BLUE is related to the buffer size. The Flow based AQMs, REM and GREEN can maintain the same utilisation with low backlog even with high buffer sizes. This means it is possible to have a large buffer, to reduce packet loss, without the drawback of high packet delay common to queue based flow control processes. Indeed with REM and GREEN, it is possible to select a low target utilisation, and operate almost entirely in the zero queue region, eliminating queuing delay.

All processes except BLUE maintained high utilisation as BLUE sacrificed utilisation for lower backlog and loss. There is a single 'sweet-spot' for BLUE at around 100 ms queue size, where greater maximum buffer sizes increase the queuing delay, and a lower buffer size decreases the utilisation. In contrast, GREEN has consistent performance across a variety of buffer sizes. By operating GREEN with a sufficient buffer size, GREEN is in a very robust region where queuing delay and packet loss probability are low. This makes GREEN much easier to deploy, and performs better with unpredictable traffic patterns. REM has a very similar performance to GREEN in this trial.

Trial 3 explored further the behaviour of REM and GREEN in an edge router. The delay of the bottleneck link 30 was varied from 10 to 80 ms in this trial. 400 TCP sources were started during the 120 second simulation period (43 concurrent flows average). A buffer size of 91 packets was used.

Figure 5:
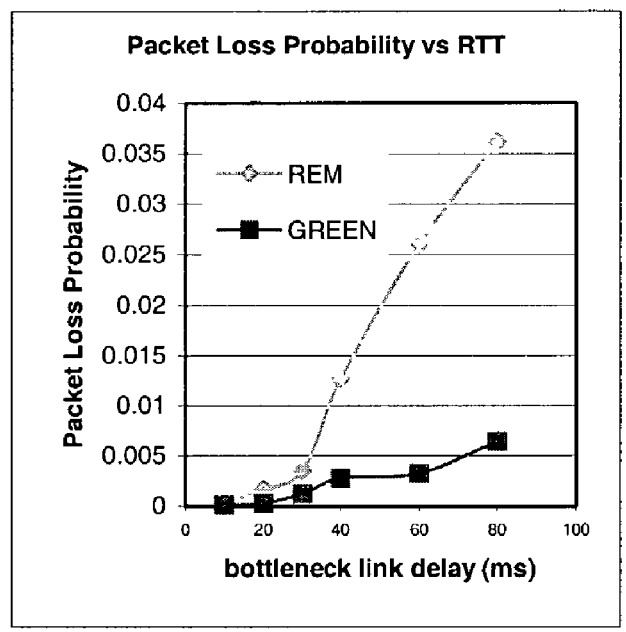
FIG. 5 is a graph of packet loss probability against round trip time for two AQM processes.
Figure 6:
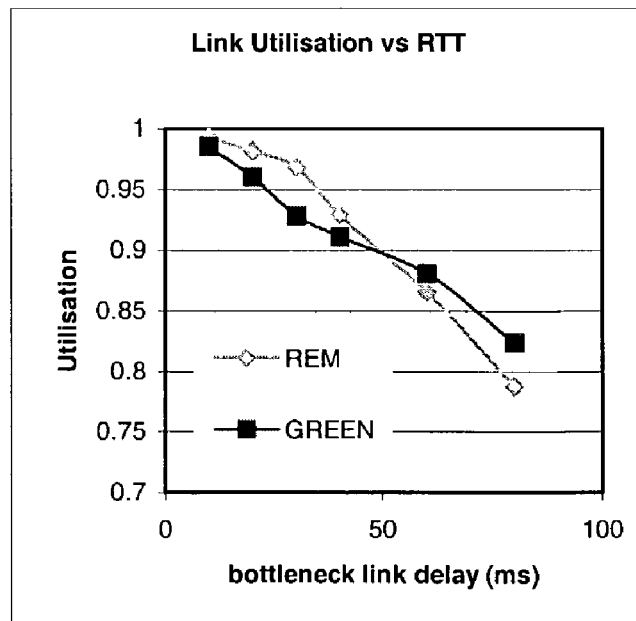
FIG. 6 is a graph of link utilisation against round trip time for two AQM processes.

Any AQM deployed should be robust to variations in RTT, which result from the wide use of RED and drop-tail. For an AQM to be robust, there should be a graceful degradation in queuing performance if the actual bandwidth delay product becomes greater than the buffer size. FIGS. 5 and 6 show how the AQMs performance degrades when the bottleneck link's delay is increased, making the bandwidth delay product greater than the queue size (around 30 ms link 1-2 delay). REM's loss rate increased significantly beyond this threshold, whereas GREEN's performance degraded more gracefully.

The difference in performance between REM and GREEN originates in REM's linear price adjustment (x-c). REM exhibits the problem that when the traffic drops, the price P is decreased drastically because of (x-c). A drop in arrival rate does not always represent a drop in demand. REM misinterprets the instantaneous flow decrease to a decrease in demand and decreases its price in two situations:

(1) Finite queues mean there is a possibility of overflow. Upon overflow, the flow rate decreases drastically. REM misinterprets this as a decrease in demand and drops the price heavily. By dropping the link price, REM invites another overflow. GREEN remains calm upon overflow by ignoring the magnitude of x-c.

(2) With only tens of flows active, the traffic is bursty and reflects TCPs ramp behaviour. Smooth Gaussian packet arrivals begin to occur with only hundreds of flows. The parameters of the AQM should be valid for this range of traffic without reconfiguration, as the edge router lives in such an environment. As REM is more aggressive in price adjustment, the bursty packet arrivals with tens of sources can be misinterpreted as a drop in demand. GREEN maintains a more steady dropping probability in face of low number of sources which results in a lower packet loss probability as seen in Trial 2. Decreasing γ in REM can achieve this for one set of operating conditions, however at the cost of performance at higher flow levels.

By definition, the arrival rate should be matched to the link capacity for a system to maintain high utilisation. With finite buffers, this variation in arrival rate should be tightly bounded, otherwise overflow will occur. So only small deviations in x, arrival rate, away from c, capacity target, occur in a stable system with low loss and high utilisation, and most of the control action is done in this region. Large differences in x and c are more likely due to buffer overflow or TCP ramp behaviour in the low aggregation case. By using a step function as a marking probability adjustment, GREEN ignores large differences which are more likely discontinuous conditions, such as buffer overflow, than changes in bandwidth demand. This makes GREEN robust in a wide set of realistic constrained conditions.

For networks requiring multi-service (ie differentiated classes of service for packet traffic), Diffserv, as discussed in RFC's 2474, 2597 and 2598, is being proposed as a means for providing QoS to different services. Packets are labelled with a priority and a scheduling decision is made at each node base on this priority. With GREEN a new and simpler solution is possible for two types of applications, 1) real-time (RT) and 2) non-real-time (NRT). RT applications require low delay and may not implement congestion control. NRT applications are insensitive to delay, and implement congestion control, such as TCP, ie: HTTP, FYP and Telnet. A link using GREEN will deliver low delay and loss to RT applications, as GREEN's congestion control forces NRT applications to buffer at the source in face of increased RT demand. Assuming that the total capacity is greater than the RT peak demand, GREEN's congestion notification controls the responsive NRT arrival rate so that the aggregate arrival rate (NRT+RT) is below the capacity. Deploying GREEN enables both classes of traffic to coexist. However, it is also possible to use GREEN with Diffserv, and here GREEN would manage all or some of the queues in each of the service classes designated by Diffserv fields in packets.

The GREEN AQM process is particularly advantageous as it maintains a low packet loss rate as well as low average queue size. The process is simple, robust, low in computational complexity, easily configured, and self-contained to a single router, making it easy to deploy. Having a low number of tuning parameters, the GREEN AQM process is particularly suitable to deployment in network equipment. Minimising the number of tuning parameters improves the speed and ease of configuration. This is significant especially if configured by non-expert technicians.

Yet, with Explicit Congestion Notification (ECN) still not widely deployed, the main congestion notification mechanism remains packet dropping. AQM processes which reduce the Round Trip Time (RTT), like GREEN or REM, cause TCP sessions to become very aggressive in their rate of increase of transmission rate which makes the packet dropping rate required for congestion notification to be very high. A solution to the problem of loosing efficiency due to too many dropped packets is described below and is based on inducing latency. When applied to an AQM, such as GREEN or REM, it limits the packet loss whilst the Internet makes the transition to ECN. The solution can improve the efficiency of GREEN or REM by about 25%.

Figure 9:
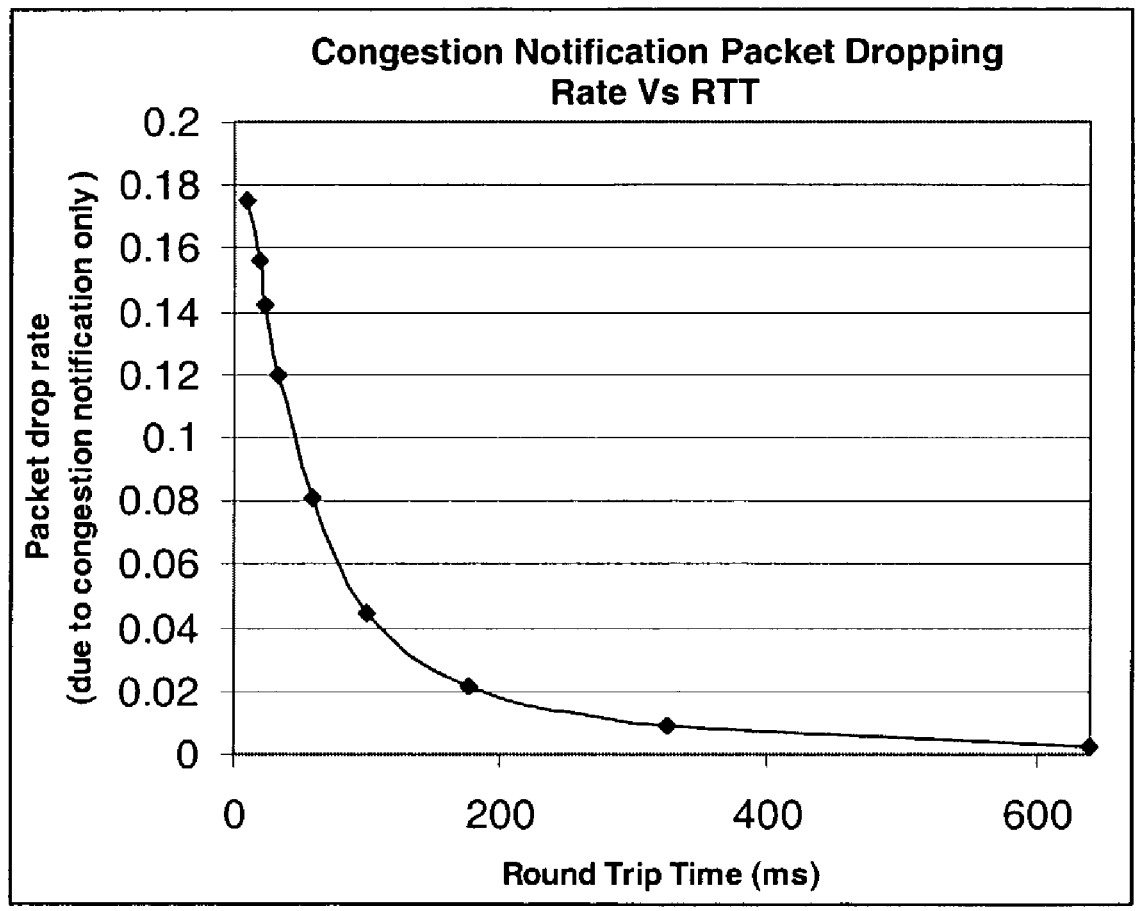
FIG. 9 is a graph of packet drop rate against round trip time for a TCP source.

The severity of the packet dropping required in a low latency network is illustrated in FIG. 9. GREEN was used as the AQM in this experiment. Here the loss rate of a single TCP session is plotted as the function of a controlled RTT and this shows the high drop rates required by the congestion control mechanism for low RTT (17% at 10 ms RTT).

The transmission efficiency of a TCP source as a function of the Round Trip Time RTT can be determined from the model of TCP (derived from the TCP Friendly Equation discussed in Floyd), and is approximately given by:

$$E = 1 - \left(\frac{k \cdot B}{T \cdot R}\right)^2. \tag{6}$$

where k is a constant, B is the packet size, R the round trip time, and T is the transfer rate. The efficiency is highly sensitive to the RTT R, and efficiency cannot be maintained as the latency is reduced for non-ECN sources. This creates a problem in operating AQMs that aim to reduce queuing in an environment that includes non-ECN sources. By inducing a delay on non-ECN packets to bound the packet loss necessary for congestion control this can be avoided. In this way, the RTT delay can be the minimum delay required to bound the loss below some desired maximum loss $l_d$, and bound the efficiency to be above some lower bound.

It is possible to distribute this enforced delay in a number of queues across the links of the network so that the total delay of the route is the minimum delay, or a conservative policy is to enforce the minimum delay at each queue.

Figure 7:
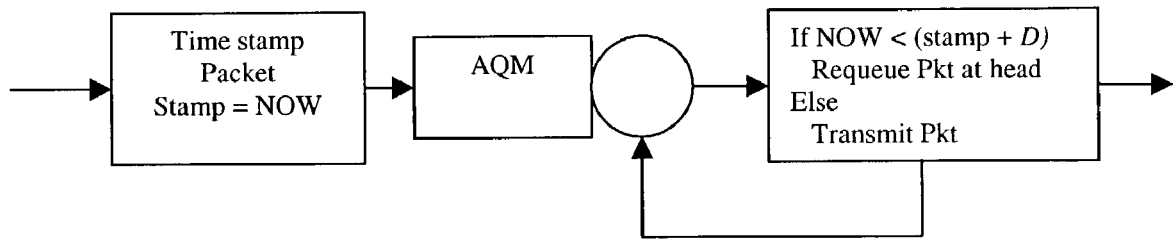
FIG. 7 is a flow diagram of a first preferred method of inducing a delay in an AQM queue.

One way to implement the induced delay D is by setting a time stamp on the arriving packet with the current time and not dequeuing the packet until the current time is past D+stamp, as shown in FIG. 7. There are many alternative ways of implementing an induced delay in a queue.

The unfortunate consequence of enforcing the minimum delay D is that ECN enabled flows, which can successfully operate with low latencies, must also suffer the enforced delay. The ideal case would be to have all sources ECN enabled, and not require the enforced delay D at all. However, the Internet will continue to have a mixture of ECN and non-ECN TCP sources. If AQMs, such as REM or GREEN, were deployed without the enforced delay, the low latencies they create and resulting high congestion notification rate may cause unfair allocation of bandwidth to ECN enabled flows, as non-ECN flows may suffer many timeouts and retransmission inefficiencies on low latency routes.

Figure 8:
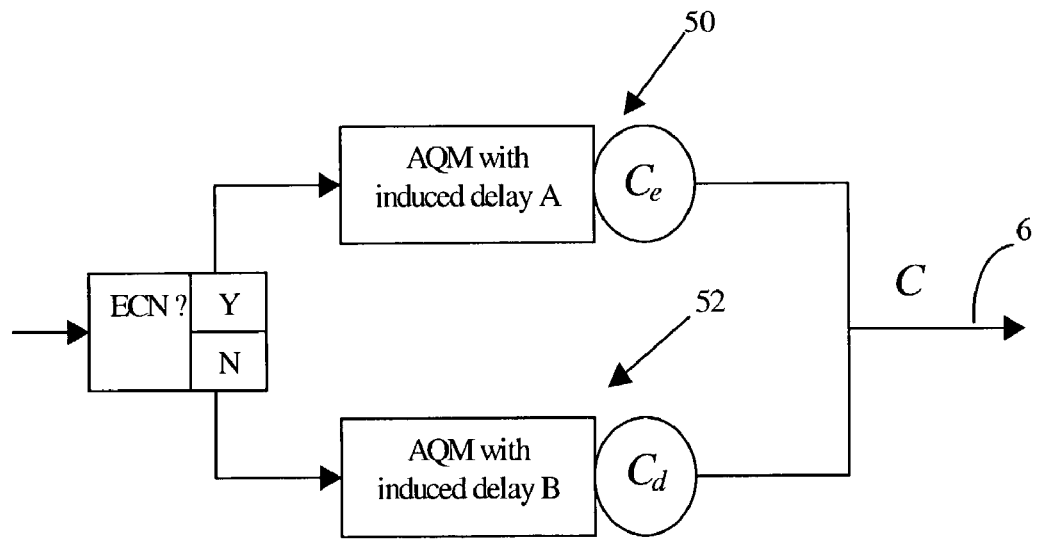
FIG. 8 is a flow diagram of a second preferred method of inducing delay in packets managed by an AQM process.

The above can be addressed by using a notification signal splitter (NSS), as shown in FIG. 8. The NSS may be provided by a dedicated hardware component or executed by a software code adjustment to code for the AQM.

The NSS maintains separate queues 50, 52 for ECN enabled packets and non-ECN enabled packets respectively for each link 6. When the packet arrives, the packet is sent to either queue based on the ECN Capable Transport (ECT) bit in the IP header. Each queue is controlled by a separate instance of the AQM process. The non-ECN queue 52 enforces a minimum delay B on the packets routed through it and the ECN queue 50 enforces a minimum delay A. The preferred configuration is that A, the delay for ECN, is 0 and B is set to the minimum delay required to keep the drop rate below the desired level. Alternatively the non-ECN queue 52 may achieve the same affect by enforcing a maximum limit on its drop rate P. Assuming that the capacity of the link is C, and the capacity of the ECN queue is $C_e$ and the non-ECN is $C_d$, then in the preferred configuration, the following is satisfied:

$$C = C_e + C_d \quad (7)$$

The actual capacities $C_e$ and $C_d$ allocated to each type of packet may be set using a variety of techniques and policies. One policy is to allocate the capacity, so that non-ECN and ECN TCP sources get a fair share of the available bandwidth. To allocate the capacity fairly to ECN and non-ECN flows, $C_e$ and $C_d$ are set proportionally to the number of ECN $N_e$ and non-ECN $N_d$ sources respectively:

$$\frac{N_e}{N_d + N_e} C = C_e \quad (8)$$

$$\frac{N_d}{N_d + N_e} C = C_d \quad (9)$$

The NSS allows AQMs to provide the latency performance possible with ECN enabled packets to the ECN packets, whilst preserving the efficiency of non-ECN enabled packets.

A high performance DiffServ architecture can be provided by applying a rate based AQM process, such as GREEN, to a packet scheduling process of a router or switch. Open loop scheduling processes determine which packet to send next from a queue, and the decision is normally based on the order of packet arrival and a packet priority class. The DiffServ architecture uses a 3 bit code in each packet to identify the priority class. Scheduling of the packet controls the order of transmission as well as the relative bandwidth allocation to each class. Examples of scheduling processes include First In First Out (FIFO), Round Robin (RR), Priority Scheduling (PS) and Weighted Fair Queueing (WFQ). The manufacturers of IP routers have recognised the need for the use of such scheduling processes, but the existing architecture for congestion control in a class-based environment remains crude. These deficiencies can be addressed, as described below, by applying a rate based AQM, such as GREEN, that is configured to operate a class based scheduler.

Figure 10:
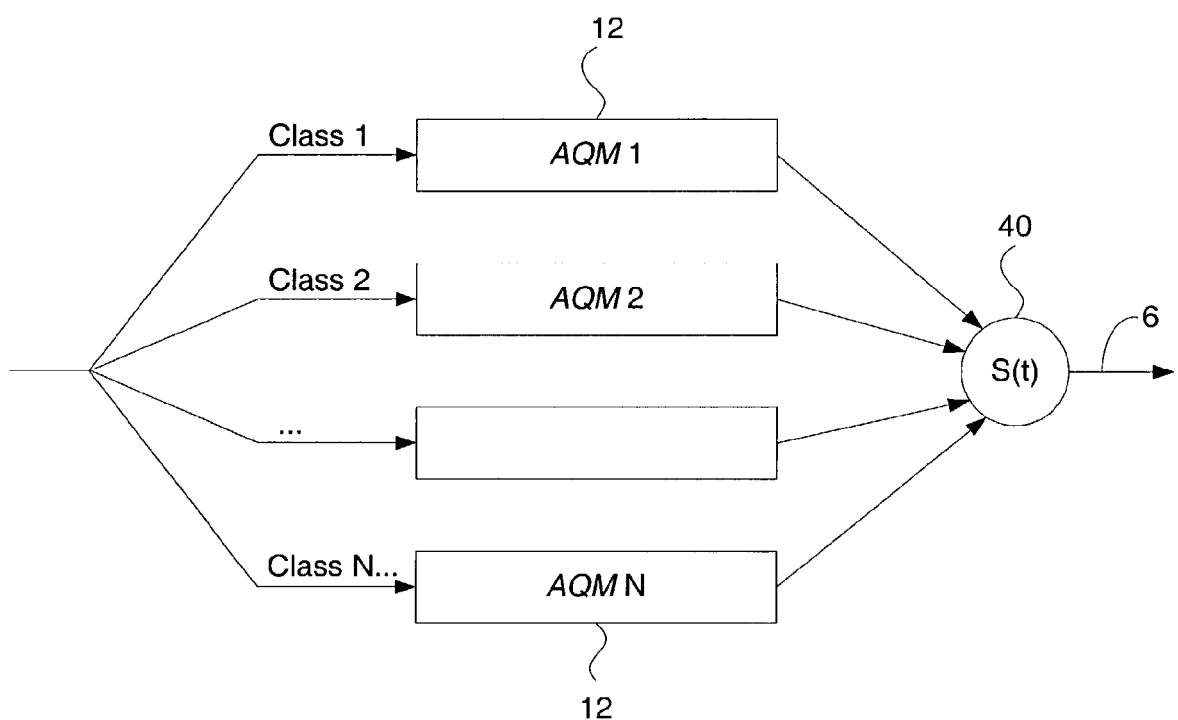
FIG. 10 is a block diagram of the queues and scheduler for a router of classified traffic.

The GREEN process can be applied to a work conserving WFQ like scheduler. A work conserving scheduler is never idle if there are any packets in any queue. A WFQ like scheduler, such as RR and many variants of WFQ, allocates a portion of service time to each queue during an interval of operation. A DiffServ link is interfaced to by different priority queues and a scheduler. Enqueue and dequeue functions, which accept and provide the next packet for queuing or transmission respectively. The scheduler 40 may be implemented by the dequeue function. As shown in FIG. 10, each queue 12 for the scheduler 40 is managed by a separate instance of an AQM process. The AQM process decides which packets to drop or ECN mark. The distinctive issue, faced by GREEN in a class based scheduler 40, is that the capacity available to each class i, denoted $c_i$, and the packet arrival rate for that class, denoted $x_i$ needs to be determined. In a work conserving scheduler 40, such as WFQ, where unused capacity in one class is redistributed to other classes, the capacity available to each class is time-varying and depends on, and affects, the traffic in other classes.

The processes as described below enable an AQM, such as GREEN, to determine and control the capacity $c_1$ allocated to each class. A basic process is first described where each class is guaranteed its minimum share, $M_i$. However, the capacity above the minimum is not distributed with any notion of fairness. Instead, the classes with the most aggressive traffic win the slack capacity. The basic process however can be extended, as further described below, by introducing a notion or proportional fairness and enforcing it.

Consider a stream of packets scheduled by a work conserving WFQ scheduler, of N classes. Let B be the vector representing the sizes (bits) of the H packets that have been served most recently. The order of the elements of vector B are in reverse order to their service completion times. In other words, $B_0$ is the size of the most recently served packet, $B_1$ is the size of the previous packet and so on. Finally, $B_h$ is the size of the oldest packet packet in B. Similarly, the vector C, of H elements, is defined such that $C_j$ is the class ($C_j \in \{1, 2, 3, \ldots N\}$) of the packet represented by $B_j$, j=1, 2, 3, ... H.

Let S(t) be the physical capacity of the link 6 at time t. When S(t) is time varying, such as with Ethernet, DSL, or radio, it can be estimated from the last packet's transmission time. The scheduling process, such as WFQ, may guarantee minimum rates to each class. Let W be a vector whose element $W_i$ corresponds to the share of capacity that each class i is guaranteed. For a WFQ scheduler 40, $W_i$ corresponds to the service quantum for class i.

In a work conserving scheduler 40, the actual capacity available to a class depends on the traffic in other classes as well as on the minimum rate allocation W. Without apriori knowledge of the traffic, the future capacity available to a class, can only be estimated from the previous capacity. Let the identity function I(j,i) be:

$$I(j, i) = \begin{cases} 1 & \text{if } C_j = i \\ 0 & \text{otherwise.} \end{cases} \quad (10)$$

The estimated class capacity, $S_i(t)$, is determined from the portion of server time allocated to class i by the scheduler 40 in the past H packets:

$$S_i(t) = \frac{\sum_{j=0}^{H} B_j(t) \cdot I(j, i)}{\sum_{j=0}^{H} B_j} S(t) \text{ where } i < N. \quad (11)$$

This is a historical determination based on the last H packets received which are used to proportion the capacity S(t) for each class i. Equation (11) is an exact form, but simpler, less computationally intensive methods, which are less accurate, could be used to estimate the available capacity. Reduced complexity techniques such as exponential averaging can be employed to resolve equation (11).

The minimum service rate, $M_i$, guaranteed by the WFQ scheduling mechanism is given by:

$$M_i(t) = \frac{W_i}{\sum_{j=1}^{N} W_j} S(t). \quad (12)$$

The capacity allocated to each class is therefore also bounded by the minimum rate enforced by the WFQ scheduling policy. The capacity allocated to class i, denoted $c_i(t)$, is:

$$c_i(t) = \text{Max}(M_i(t), S_i(t)) \quad (13)$$

The capacity $c_i(t)$ is the capacity allocated to class i, not the capacity actually consumed by class i. The capacity not consumed by the class to which it is allocated, may be used by other classes. If for example, no class i packets arrive, $S_i(t)$ will be 0, and $c_i(t) = M_i(t)$. Although in this case no capacity is consumed by class i, if a burst of class i packets were to arrive, $M_i(t)$ capacity is guaranteed. The process stipulated by equation (13) is evaluated at each update of the GREEN AQM process, which at the maximum rate, is at every enqueue event.

The above can be extended to enforce a notion of fairness. For fair allocation, enforcement need only apply to bottlenecked classes, where $x_i(t) \geq c_i(t)$. Classes which are not bottlenecked at the link, $x_i(t) < c_i(t)$, need no enforcement of fairness, since their rate is below their fair capacity and their bandwidth demand is satisfied. One notion of fairness that can be used for distributing the capacity to bottlenecked classes is proportional fairness, where class i receives an amount of the slack capacity which is proportional to its parameter $W_i$. A proportionally fair allocation of capacity to a bottlenecked class i, $F_i(t)$, is:

$$F_i(t) = \frac{W_i}{\sum_{j=\text{all bottlenecked classes}} W_j} \left( S(t) - \sum_{j=\text{all non-bottlenecked classes}} x_j \right). \quad (14)$$

This applies a proportion of the available capacity determined by the term in brackets to a bottlenecked class i. In the extended process, the capacity of non-bottlenecked classes is given by equation (13), and for bottlenecked classes, the capacity is given by equation (14). The sum of $c_i(t)$ for non-bottlenecked given by equation (13) and $F_i(t)$ given by equation (14) may be more than S(t). However, the non-bottlenecked classes do not utilise their allocated capacity $c_i(t)$, and the aggregate arrival rate is controlled below the capacity S(t).

For class i, an implementation of a rate based AQM, such as GREEN, in the queues 12 for a WFQ scheduler, is as follows:

$$P_i(t) = P_i(t) + \Delta P_i(t) \cdot U(x_i(t) - u_i \cdot c_i) \quad (15)$$

where $$U(x) = \begin{cases} +1 & x \geq 0 \\ -1 & x < 0 \end{cases} \quad (16)$$

and $$\Delta P_i(t) = \max(\text{abs}(\alpha_i(x_i(t) - u_i \cdot c_i(t))), k). \quad (17)$$

where $u_i$ is a constant which controls the target utilisation and hence also the level of queuing, $\alpha_i$ is the control gain which affects speed and stability of control, and k is a constant which limits the minimum adjustment to $P_i(t)$, to improve convergence. The term $u_i \cdot c_i(t)$ represents a target capacity for a class. The values of $P_i(t)$, $x_i(t)$ and $c_i(t)$ are updated with every class i packet arrival. The pseudo-code that may be used for the WFQ scheduling process of the scheduler 40 is:

```
pkt* wfq.deque( )
{
    while (TRUE)
    {
        for I = 1 to N {
            if (class[I].nextpkt.size < S[I])
            {
                S[I] = S[I] - class[I].nextpkt.size( );
                return (class[I].dequeue);
            }
        }
        for I = 1 to N {
            if (S[I] < MaxS );
                S[I] = S[I] + W[I];
        }
    }
}
wfq.enque (pkt *packet)
{
    class [packet.class].enque (packet);
}
```

This particular WFQ variant minimizes the jitter of higher priority classes, by sacrificing the jitter performance of lower classes. The wfq.deque function is invoked when the link 6 is ready to transmit the next packet and the wfq.enque function is invoked when a packet is received for transmission onto the link. A packet queued in a higher priority class will always be served next, so long as the class's work quantum, W[I], has not been exceeded. The function class [I].nextpkt.size returns the size [bits] of the next packet in class I, or infinity if there are no packets left in the class. The constant MaxS controls the maximum burst size allowable to be transmitted in a class that has been previously idle.

Figure 11:
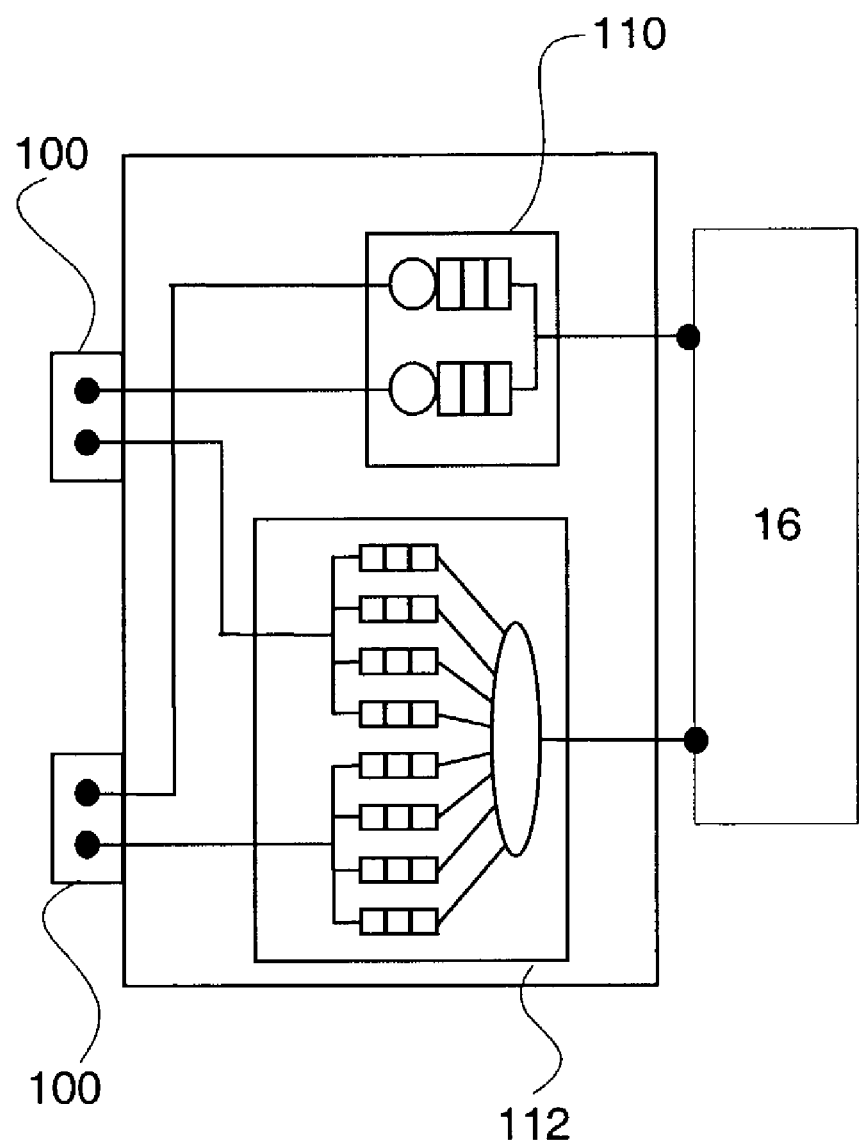
FIG. 11 is a block diagram of a input/output module of a switch.

A rate based (RB) AQM can be employed in devices such as combined input and output queued (CIOQ) switches or routers, which have multiple queues where the capacities depend on cross-traffic between multiple input and output interfaces. An example input/output (I/O) module of such a switch is as shown in FIG. 11. For the physical input/output interfaces 100, there are output queues 110 and input queues 112 that connects to the switch fabric 16. The switch fabric 16 may be a space division switch matrix typically implemented using a cross-bar architecture, as described in Vinita Singhal and Robert Le, "High-Speed Buffered Crossbar Switch Design Using Virtex-EM Devices", www.xilinx.com, Xilinx Application Note, 2000. There are four input queues 112 for each of the four physical output interfaces possible in the switch 100 (only two shown) and a scheduler for all queues. There are two output queues 110, one for each of the physical interfaces 100 shown in FIG. 11.

Figure 12:
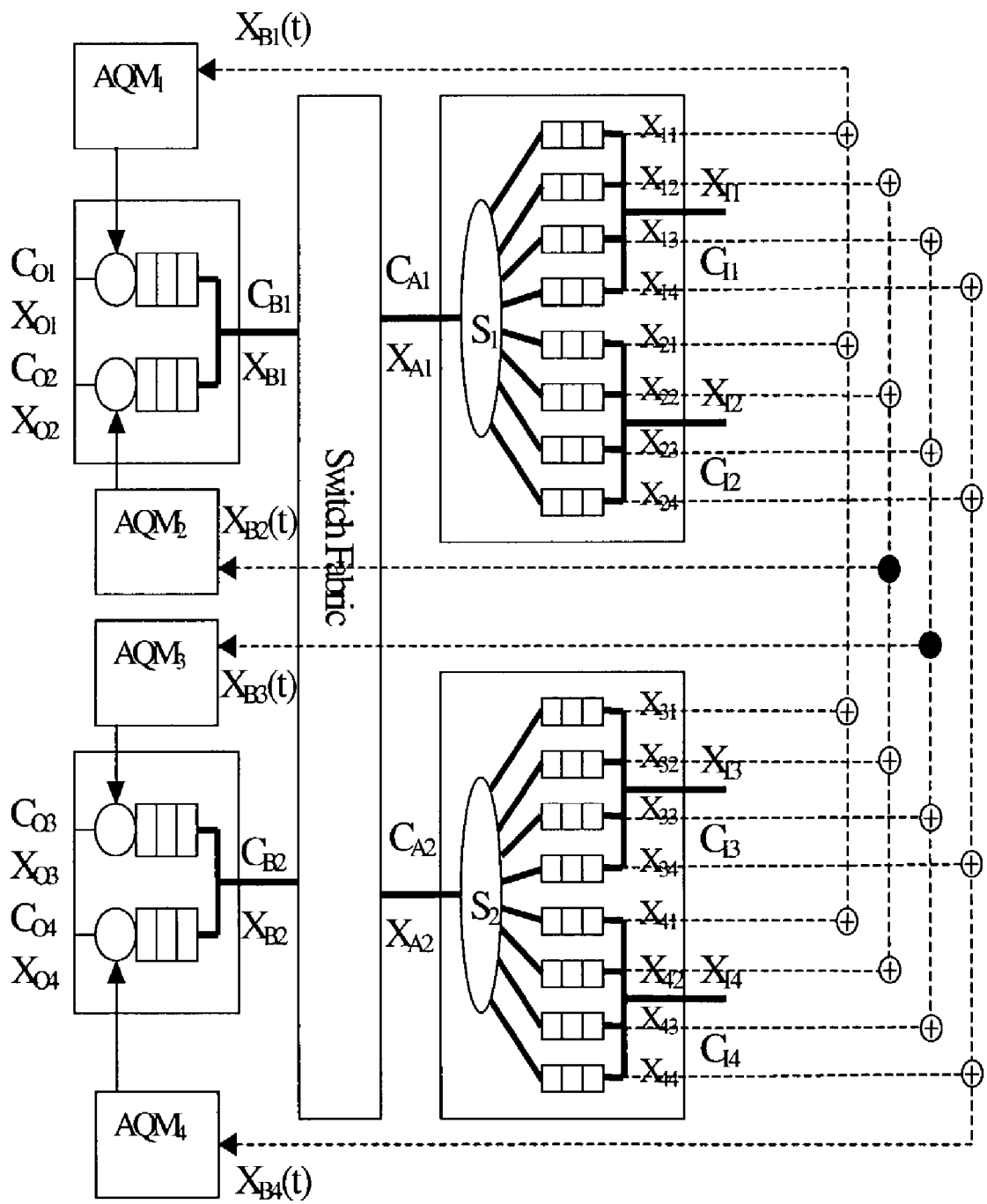
FIG. 12 is a diagram of a rate based AQM switch.

An RB AQM switch or router is shown in FIG. 12 with the input and output functionality of the I/O module separated into virtual input and output modules interconnected by the switch fabric 16. For each physical output port m, there is one instance of the control process $AQM_m$ and this is all that is required. It is not necessary to implement the RB AQM for all queues, such as the input queues. The bold lines in FIG. 12 show traffic flow, whereas the dotted lines show the data measurements derived from that flow.

The parameters which completely define the switch fabric 16 are the input port capacity $C_{Ai}$ for each input port i, and output port capacity $C_{Bj}$ for each output port j. It is assumed that given these capacity constraints, the switch fabric is able to forward any input to output port traffic.

There are I input modules in the switch. Each input module d has a set of input interfaces $IC_d$. Each input interface n is an element in the set $IC_d$ and has capacity $C_{In}$. The aggregate traffic arriving at input interface n is $X_{In}$ bits/s. The traffic arriving at input interface n destined for output interface m is $X_{nm}$ bits/s. Each input module has a separate queue for each output interface destination. Each input module d has a work conserving scheduler $S_d$, for example a round robin scheduler, which determines the next packet to forward to the switch fabric input port. The aggregate traffic forwarded from input module d to a switch input port is $X_{Ad}$.

There are O output modules in the switch. Each output module e has a set of output interfaces $OC_e$. Each output interface m is an element in the set $OC_e$ and has capacity $C_{Om}$. The traffic output by an output interface m is $X_{Om}$. The traffic arriving at the input of the output module e from the switch fabric output port is $X_{Be}$.

The total packet arrival rate $X_m(t)$ and packet backlog $B_m(t)$ destined for output interface m as well as the output interface capacity $C_{Om}(t)$ are measured. The capacity $C_{Om}(t)$ can be estimated by measuring the packet size and transmission time, or set to a chosen value.

To measure $X_m(t)$ each input module measures and stores $X_{nm}(t)$ and $B_{nm}(t)$, the backlog of packets in input interface n destined for output interface m. The maximum rate at which these $B_{nm}(t)$ and $X_{nm}(t)$ measurements need to be communicated from the input module to the AQM process is at each packet arrival. The total packet arrival rate $X_m(t)$ and backlog $B_m(t)$ are inputs into the AQM process:

$$X_m(t) = \sum_{n=1}^{I} X_{nm}(t) \tag{18}$$

$$B_k(t) = \sum_{n=1}^{I} B_{nm}(t) + B_{Am}(t) \tag{19}$$

where $B_{Am}(t)$ is the packet backlog in the output interface m. The RB AQM used by each output queue may be GREEN, in which case the estimated packet arrival rate is $X_m(t)$ and the target capacity is $C_{Om}(t)$, and both are used to update the congestion notification rate $P_m(t)$. The marking and dropping strategy may be different. For ECN capable packets, the mark-front strategy investigated in Chunlei Liu, Raj Jain, "Improving Explicit Congestion Notification with the Mark-Front Strategy", Computer Networks, Vol 35, no 2-3, pp 185-201, February 2001 reduces the feedback time of the congestion signal. Therefore ECN capable packets are randomly marked in the output module at the head of the output queue. Non-ECN capable packets, are randomly dropped and this should be done at the earliest point in the switch. This prevents the packet which will ultimately be dropped from being forwarded through the switch and avoids wasting switch fabric and buffer capacity.

Many modifications will be apparent to those skilled in the art without departing from the scope of the present invention as herein described with reference to the accompanying drawings.

What is claimed is:

1. An active queue management process, including:
   applying at a rate P congestion notification to communications packets in a queue of a link; and
   adjusting said rate P of congestion notification on the basis of the difference between an arrival rate for said packets and a target capacity of said link;
   wherein said rate P of congestion notification is incremented by an amount $\Delta P$ at an update rate when said arrival rate is above said capacity, and P is decremented by $\Delta P$ at said update rate when said arrival rate is less than said capacity.

2. A process as in claim 1, wherein $P=P+\Delta P \cdot U(X_{est}-c_t)$, where $X_{est}$ is the estimated arrival rate, $c_t$ is the target capacity of the link, and $$U(x) = \begin{cases} +1 & x \geq 0 \\ -1 & x < 0 \end{cases}.$$

3. A process as in claim 2, wherein $\Delta P=\max(abs(\alpha(x_{est}-c_t), k)$, where $\alpha$ is a constant to control gain, and k is a constant to limit minimum adjustment to P.

4. A process as in claim 2, wherein $X_{est}=(1-\exp(-Del/K))*(B/Del)+\exp(-Del/K)*X_{est}$, where Del is the time between received packets, B the packet size and K is a time constant.

5. A process as in claim 1, wherein said link has a plurality of said queue allocated respectively to priority classes i of said packets and for each queue, said rate of congestion $Pi(t)$ at a given time t is:

$$P_i(t)=P_i(t)+\Delta P_i(t) \cdot U(x_i(t)-u_i \cdot c_i(t))$$

where $$U(x) = \begin{cases} +1 & x \geq 0 \\ -1 & x < 0 \end{cases}$$

and $$\Delta P_i(t) = \max(abs(\alpha_i(x_i(t) - u_i \cdot c_i(t))), k_i) \text{ and}$$

$x_i(t)$ is said arrival rate for said queue, $c_i(t)$ is a capacity of said link allocated to said queue, $\alpha_i$ is a constant for said queue, $u_i$ is a constant for said queue such that $u_i \cdot c_i(t)$ is said target capacity for said queue, $k_i$ is a constant for said queue, and said update rate is when a class i packet arrives at said queue.

6. A process as in claim 1 including inducing a predetermined delay in said packets of said queue.

7. A process as in claim 6, wherein explicit congestion notification (ECN) packets have no induced delay in said queue and other packets in said queue have said predetermined delay.

8. A process as in claim 7, including having two queues for said link, one for said ECN packets and one for said other packets.

9. A process as in claim 1 including setting a limit for the congestion notification rate.

10. An active queue management process, including:
applying congestion notification to communications packets in a plurality of queues of a link, said congestion notification being applied at respective rates for said queues; and
adjusting said rates of notification on the basis of the respective arrival rates for said packets in said queues; and
scheduling said packets of said queues for said link:
wherein the respective capacities of said queues is estimated, and the rate of congestion notification is adjusted on the basis of the difference between said arrival rate and the estimated capacity for each of said queues; and
wherein said queues are for respective classes of packets and the estimated class capacity, $S_i(t)$, for a queue is determined on the basis of time allocated to class i by a scheduling process for the past H packets by $$S_i(t) = \frac{\sum_{j=0}^{H} B_j(t) \cdot I(j, i)}{\sum_{j=0}^{H} B_j} S(t) \text{ where } I(j, i) = \begin{cases} 1 & \text{if } C_j = i \\ 0 & \text{otherwise} \end{cases},$$

B is a vector representing the size of the H packets that have been served most recently, C is a vector of H elements such that $C_j$ is the class ($Cj \in \{1,2,3, \ldots N\}$ of the packet represented by $B_j, j=1, 2, 3, \ldots H$.

11. Network communications equipment, including:
a switch component for switching communications packets between input ports and output ports;
packet queues for at least said output ports; and
an active queue manager for applying congestion notification to communications packets in the queues for said output ports, said congestion notification being applied at respective rates for said queues, and adjusting said rates of congestion notification on the basis of the respective arrival rates of the packets for said queues of said output ports:
wherein said rate P of congestion notification is incremented by an amount ΔP at an update rate when said arrival rate is above a target capacity for the link associated with each of said queues, and P is decremented by ΔP at said update rate when said arrival rate is less than said capacity.

12. Network communications equipment as in claim 11, wherein the respective capacities of said queues is estimated, and the rate of congestion notification is adjusted on the basis of the difference between the arrival rate and the estimated capacity for each of said queues.

13. Network communications equipment as in claim 11, wherein $P=P+\Delta P \cdot U(X_{est}-c_t)$, where $X_{est}$ is the estimated arrival rate, $c_t$ is the target capacity of the link, and $$U(x) = \begin{cases} +1 & x \geq 0 \\ -1 & x < 0. \end{cases}$$

14. Network communications equipment as in claim 11, wherein said queues are for respective classes of packets and the estimated class capacity, $S_i(t)$, for a queue is determined on the basis of time allocated to class i by a scheduling process for the past H packets by $$S_i(t) = \frac{\sum_{j=0}^{H} B_j(t) \cdot I(j, i)}{\sum_{j=0}^{H} B_j} S(t) \text{ where } I(j, i) = \begin{cases} 1 & \text{if } C_j = i \\ 0 & \text{otherwise} \end{cases},$$

B is a vector representing the size of the H packets that have been served most recently, C is a vector of H elements such that $C_j$ is the class ($Cj \in \{1, 2, 3, \ldots N\}$) of the packet represented by $B_j, j=1, 2, 3, \ldots H$.

15. Network communications equipment as in claim 11, wherein said queues are allocated respectively to priority classes i of said packets and for each queue, said rate of congestion Pi(t) at a given time t is:

$P_i(t) = P_i(t) + \Delta P_i(t) \cdot U(x_i(t) - u_i \cdot c_i(t))$ where $$U(x) = \begin{cases} +1 & x \geq 0 \\ -1 & x < 0 \end{cases}$$

and $\Delta P_i(t) = \max(\text{abs}(\alpha_I(x_i(t) - u_i \cdot c_i(t))), k_I)$ and $x_i(t)$ is said arrival rate for said queue, $c_i(t)$ is a capacity of said link allocated to said queue, $\alpha_I$ is a constant for said queue, $u_i$ is a constant for said queue such that $u_i \cdot c_i(t)$ is said target capacity for said queue, $k_I$ is a constant for said queue, and said update rate is when a class I packet arrives at said queue.

16. Network communications equipment having an active queue manager for executing the steps of claim 1.

17. Computer readable medium comprising software for executing the steps of an active queue management process as claimed in claim 1.

* * * * *